US011379127B2

(12) United States Patent
Li

(10) Patent No.: US 11,379,127 B2
(45) Date of Patent: Jul. 5, 2022

(54) METHOD AND SYSTEM FOR ENHANCING A DISTRIBUTED STORAGE SYSTEM BY DECOUPLING COMPUTATION AND NETWORK TASKS

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

(*) Notice: Subject to any disclaimer, the term of this patent is extended or adjusted under 35 U.S.C. 154(b) by 5 days.

(21) Appl. No.: 17/087,101

(22) Filed: Nov. 2, 2020

(65) Prior Publication Data
US 2021/0072907 A1 Mar. 11, 2021

Related U.S. Application Data

(63) Continuation of application No. 16/515,889, filed on Jul. 18, 2019, now Pat. No. 10,860,223.

(51) Int. Cl.
*G06F 3/06* (2006.01)
*G06F 9/48* (2006.01)
*G06F 13/40* (2006.01)

(52) U.S. Cl.
CPC ........... *G06F 3/0626* (2013.01); *G06F 3/067* (2013.01); *G06F 3/0652* (2013.01);
(Continued)

(58) Field of Classification Search
CPC ...... G06F 3/0626; G06F 3/0652; G06F 3/067; G06F 9/4806; G06F 13/4022; G06F 2213/0026; G06F 2213/3808
See application file for complete search history.

(56) References Cited

U.S. PATENT DOCUMENTS 3,893,071 A 7/1975 Bossen
4,562,494 A 12/1985 Bond
(Continued)

FOREIGN PATENT DOCUMENTS

JP 2003022209 1/2003
JP 2011175422 9/2011
(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — Henry Tsai
*Assistant Examiner* — Aurangzeb Hassan
(74) *Attorney, Agent, or Firm* — Shun Yao; Yao Legal Services, Inc.

(57) ABSTRACT

One embodiment provides a computer system. The computer system comprises: a plurality of storage devices; and a first component functioning both as a network interface card and as an access switch, wherein the first component is configured to manage connections to the plurality of storage devices. A respective storage device comprises: an Ethernet port coupled to the first component; at least one microprocessor; a plurality of PCIe lanes; and a plurality of storage drives with non-volatile memory.

20 Claims, 11 Drawing Sheets

(52) U.S. Cl.
CPC ........ *G06F 9/4806* (2013.01); *G06F 13/4022* (2013.01); *G06F 2213/0026* (2013.01); *G06F 2213/3808* (2013.01)

(56) References Cited

U.S. PATENT DOCUMENTS

| | | | |
|---|---|---|---|
| 4,718,067 A | 1/1988 | Peters | |
| 4,775,932 A | 10/1988 | Oxley | |
| 4,858,040 A | 8/1989 | Hazebrouck | |
| 5,394,382 A | 2/1995 | Hu | |
| 5,602,693 A | 2/1997 | Brunnett | |
| 5,715,471 A | 2/1998 | Otsuka | |
| 5,732,093 A | 3/1998 | Huang | |
| 5,802,551 A | 9/1998 | Komatsu | |
| 5,930,167 A | 7/1999 | Lee | |
| 6,098,185 A | 8/2000 | Wilson | |
| 6,148,377 A | 11/2000 | Carter | |
| 6,226,650 B1 | 5/2001 | Mahajan et al. | |
| 6,243,795 B1 | 6/2001 | Yang | |
| 6,457,104 B1 | 9/2002 | Tremaine | |
| 6,658,478 B1 | 12/2003 | Singhal | |
| 6,795,894 B1 | 9/2004 | Neufeld | |
| 7,351,072 B2 | 4/2008 | Muff | |
| 7,565,454 B2 | 7/2009 | Zuberi | |
| 7,599,139 B1 | 10/2009 | Bombet | |
| 7,953,899 B1 | 5/2011 | Hooper | |
| 7,958,433 B1 | 6/2011 | Yoon | |
| 8,085,569 B2 | 12/2011 | Kim | |
| 8,144,512 B2 | 3/2012 | Huang | |
| 8,166,233 B2 | 4/2012 | Schibilla | |
| 8,260,924 B2 | 9/2012 | Koretz | |
| 8,281,061 B2 | 10/2012 | Radke | |
| 8,452,819 B1 | 5/2013 | Sorenson, III | |
| 8,516,284 B2 | 8/2013 | Chan | |
| 8,527,544 B1 | 9/2013 | Colgrove | |
| 8,751,763 B1 | 6/2014 | Ramarao | |
| 8,819,367 B1 | 8/2014 | Fallone | |
| 8,825,937 B2 | 9/2014 | Atkisson | |
| 8,832,688 B2 | 9/2014 | Tang | |
| 8,868,825 B1 | 10/2014 | Hayes | |
| 8,904,061 B1 | 12/2014 | O'Brien, III | |
| 8,949,208 B1 | 2/2015 | Xu | |
| 9,015,561 B1 | 4/2015 | Hu | |
| 9,031,296 B2 | 5/2015 | Kaempfer | |
| 9,043,545 B2 | 5/2015 | Kimmel | |
| 9,088,300 B1 | 7/2015 | Chen | |
| 9,092,223 B1 | 7/2015 | Pani | |
| 9,129,628 B1 | 9/2015 | Fallone | |
| 9,141,176 B1 | 9/2015 | Chen | |
| 9,208,817 B1 | 12/2015 | Li | |
| 9,213,627 B2 | 12/2015 | Van Acht | |
| 9,280,472 B1 | 3/2016 | Dang | |
| 9,280,487 B2 | 3/2016 | Candelaria | |
| 9,311,939 B1 | 4/2016 | Malina | |
| 9,336,340 B1 | 5/2016 | Dong | |
| 9,436,595 B1 | 9/2016 | Benitez | |
| 9,495,263 B2 | 11/2016 | Pang | |
| 9,529,601 B1 | 12/2016 | Dharmadhikari | |
| 9,529,670 B2 | 12/2016 | O'Connor | |
| 9,569,454 B2 | 2/2017 | Ebsen | |
| 9,575,982 B1 | 2/2017 | Sankara Subramanian | |
| 9,588,698 B1 | 3/2017 | Karamcheti | |
| 9,588,977 B1 | 3/2017 | Wang | |
| 9,607,631 B2 | 3/2017 | Rausch | |
| 9,671,971 B2 | 6/2017 | Trika | |
| 9,747,202 B1 | 8/2017 | Shaharabany | |
| 9,836,232 B1 | 12/2017 | Vasquez | |
| 9,852,076 B1 | 12/2017 | Garg | |
| 9,875,053 B2 | 1/2018 | Frid | |
| 9,912,530 B2 | 3/2018 | Singatwaria | |
| 9,923,562 B1 | 3/2018 | Vinson | |
| 9,946,596 B2 | 4/2018 | Hashimoto | |
| 10,013,169 B2 | 7/2018 | Fisher | |
| 10,199,066 B1 | 2/2019 | Feldman | |
| 10,229,735 B1 | 3/2019 | Natarajan | |
| 10,235,198 B2 | 3/2019 | Qiu | |
| 10,268,390 B2 | 4/2019 | Warfield | |
| 10,318,467 B2 | 6/2019 | Barzik | |
| 10,361,722 B2 | 7/2019 | Lee | |
| 10,437,670 B1 | 10/2019 | Koltsidas | |
| 10,459,663 B2 | 10/2019 | Agombar | |
| 10,642,522 B2 | 5/2020 | Li | |
| 10,649,657 B2 | 5/2020 | Zaidman | |
| 10,678,432 B1 | 6/2020 | Dreier | |
| 10,756,816 B1 | 8/2020 | Dreier | |
| 10,928,847 B2 | 2/2021 | Suresh | |
| 10,990,526 B1 | 4/2021 | Lam | |
| 2001/0032324 A1 | 10/2001 | Slaughter | |
| 2001/0046295 A1 | 11/2001 | Sako | |
| 2002/0010783 A1 | 1/2002 | Primak | |
| 2002/0039260 A1 | 4/2002 | Kilmer | |
| 2002/0073358 A1 | 6/2002 | Atkinson | |
| 2002/0095403 A1 | 7/2002 | Chandrasekaran | |
| 2002/0112085 A1 | 8/2002 | Berg | |
| 2002/0161890 A1 | 10/2002 | Chen | |
| 2003/0074319 A1 | 4/2003 | Jaquette | |
| 2003/0145274 A1 | 7/2003 | Hwang | |
| 2003/0163594 A1 | 8/2003 | Aasheim | |
| 2003/0163633 A1 | 8/2003 | Aasheim | |
| 2003/0217080 A1 | 11/2003 | White | |
| 2004/0010545 A1 | 1/2004 | Pandya | |
| 2004/0066741 A1 | 4/2004 | Dinker | |
| 2004/0103238 A1 | 5/2004 | Avraham | |
| 2004/0143718 A1 | 7/2004 | Chen | |
| 2004/0255171 A1 | 12/2004 | Zimmer | |
| 2004/0267752 A1 | 12/2004 | Wong | |
| 2004/0268278 A1 | 12/2004 | Hoberman | |
| 2005/0038954 A1 | 2/2005 | Saliba | |
| 2005/0097126 A1 | 5/2005 | Cabrera | |
| 2005/0138325 A1 | 6/2005 | Hofstee | |
| 2005/0144358 A1 | 6/2005 | Conley | |
| 2005/0149827 A1 | 7/2005 | Lambert | |
| 2005/0174670 A1 | 8/2005 | Dunn | |
| 2005/0177672 A1 | 8/2005 | Rao | |
| 2005/0177755 A1 | 8/2005 | Fung | |
| 2005/0195635 A1 | 9/2005 | Conley | |
| 2005/0235067 A1 | 10/2005 | Creta | |
| 2005/0235171 A1 | 10/2005 | Igari | |
| 2006/0031709 A1 | 2/2006 | Hiraiwa | |
| 2006/0101197 A1 | 5/2006 | Georgis | |
| 2006/0156009 A1 | 7/2006 | Shin | |
| 2006/0156012 A1 | 7/2006 | Beeson | |
| 2006/0184813 A1 | 8/2006 | Bui | |
| 2007/0033323 A1 | 2/2007 | Gorobets | |
| 2007/0061502 A1 | 3/2007 | Lasser | |
| 2007/0101096 A1 | 5/2007 | Gorobets | |
| 2007/0250756 A1 | 10/2007 | Gower | |
| 2007/0266011 A1 | 11/2007 | Rohrs | |
| 2007/0283081 A1 | 12/2007 | Lasser | |
| 2007/0283104 A1 | 12/2007 | Wellwood | |
| 2007/0285980 A1 | 12/2007 | Shimizu | |
| 2008/0028223 A1 | 1/2008 | Rhoads | |
| 2008/0034154 A1 | 2/2008 | Lee | |
| 2008/0065805 A1 | 3/2008 | Wu | |
| 2008/0082731 A1 | 4/2008 | Karamcheti | |
| 2008/0112238 A1 | 5/2008 | Kim | |
| 2008/0163033 A1 | 7/2008 | Yim | |
| 2008/0195829 A1 | 8/2008 | Wilsey | |
| 2008/0301532 A1 | 12/2008 | Uchikawa | |
| 2009/0006667 A1 | 1/2009 | Lin | |
| 2009/0089544 A1 | 4/2009 | Liu | |
| 2009/0113219 A1 | 4/2009 | Aharonov | |
| 2009/0125788 A1 | 5/2009 | Wheeler | |
| 2009/0183052 A1 | 7/2009 | Kanno | |
| 2009/0254705 A1 | 10/2009 | Abali | |
| 2009/0282275 A1 | 11/2009 | Yermalayeu | |
| 2009/0287956 A1 | 11/2009 | Flynn | |
| 2009/0307249 A1 | 12/2009 | Koifman | |
| 2009/0307426 A1 | 12/2009 | Galloway | |
| 2009/0310412 A1 | 12/2009 | Jang | |
| 2010/0031000 A1 | 2/2010 | Flynn | |
| 2010/0169470 A1 | 7/2010 | Takashige | |
| 2010/0217952 A1 | 8/2010 | Iyer | |
| 2010/0229224 A1 | 9/2010 | Etchegoyen | |

(56) References Cited

U.S. PATENT DOCUMENTS

| | | |
|---|---|---|
| 2010/0241848 A1 | 9/2010 | Smith |
| 2010/0281254 A1 | 11/2010 | Carro |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0060722 A1 | 3/2011 | Li |
| 2011/0072204 A1 | 3/2011 | Chang |
| 2011/0099418 A1 | 4/2011 | Chen |
| 2011/0153903 A1 | 6/2011 | Hinkle |
| 2011/0161784 A1 * | 6/2011 | Selinger ............ G06F 11/1016 714/768 |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | McWilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2011/0302408 A1 | 12/2011 | McDermott |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0013880 A1 | 1/2013 | Tashiro |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0138871 A1 | 5/2013 | Chiu |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0179898 A1 | 7/2013 | Fang |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | D Abreu |
| 2013/0254622 A1 | 9/2013 | Kanno |
| 2013/0318283 A1 | 11/2013 | Small |
| 2013/0318395 A1 | 11/2013 | Kalavade |
| 2013/0329492 A1 | 12/2013 | Yang |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0082412 A1 | 3/2014 | Matsumura |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2014/0379965 A1 | 12/2014 | Gole |
| 2015/0006792 A1 | 1/2015 | Lee |
| 2015/0019798 A1 | 1/2015 | Huang |
| 2015/0039849 A1 | 2/2015 | Lewis |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0186657 A1 | 7/2015 | Nakhjiri |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 * | 10/2015 | Brinicombe ............ G06F 3/061 710/308 |
| 2015/0304108 A1 | 10/2015 | Obukhov |
| 2015/0310916 A1 | 10/2015 | Leem |
| 2015/0317095 A1 | 11/2015 | Voigt |
| 2015/0341123 A1 | 11/2015 | Nagarajan |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0124742 A1 | 5/2016 | Rangasamy |
| 2016/0132237 A1 | 5/2016 | Jeong |
| 2016/0141047 A1 | 5/2016 | Sehgal |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0306699 A1 | 10/2016 | Resch |
| 2016/0306853 A1 | 10/2016 | Sabaa |

(56) References Cited

U.S. PATENT DOCUMENTS

| | | |
|---|---|---|
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1 | 5/2017 | Sinclair |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185316 A1* | 6/2017 | Nieuwejaar .......... G06F 3/0611 |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1* | 8/2017 | Tsirkin ................. G11C 7/1072 |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Jung |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1* | 6/2018 | Cen ......................... G06F 3/064 |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0116127 A1 | 4/2019 | Pismenny |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1* | 9/2019 | Kachare ............... G06F 13/4282 |
| 2019/0278654 A1 | 9/2019 | Kaynak |
| 2019/0317901 A1 | 10/2019 | Kachare |
| 2019/0320020 A1* | 10/2019 | Lee ....................... G06F 13/4022 |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0089430 A1 | 3/2020 | Kanno |
| 2020/0092209 A1* | 3/2020 | Chen ....................... H04L 47/24 |
| 2020/0097189 A1 | 3/2020 | Tao |
| 2020/0143885 A1 | 5/2020 | Kim |
| 2020/0159425 A1 | 5/2020 | Flynn |
| 2020/0167091 A1 | 5/2020 | Haridas |
| 2020/0210309 A1 | 7/2020 | Jung |
| 2020/0218449 A1 | 7/2020 | Leitao |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0322287 A1* | 10/2020 | Connor ................ H04L 49/356 |
| 2020/0326855 A1 | 10/2020 | Wu |
| 2020/0328192 A1 | 10/2020 | Zaman |
| 2020/0348888 A1 | 11/2020 | Kim |
| 2020/0387327 A1 | 12/2020 | Hsieh |
| 2020/0401334 A1 | 12/2020 | Saxena |
| 2020/0409791 A1 | 12/2020 | Devriendt |
| 2021/0010338 A1 | 1/2021 | Santos |
| 2021/0075633 A1* | 3/2021 | Sen ......................... G06F 13/28 |
| 2021/0089392 A1 | 3/2021 | Shirakawa |
| 2021/0103388 A1 | 4/2021 | Choi |
| 2021/0191635 A1 | 6/2021 | Hu |
| 2021/0286555 A1 | 9/2021 | Li |

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India, pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

(56) References Cited

OTHER PUBLICATIONS

Chen Feng, et al. "CAFTL: A Content-Aware Flash Translation Layer Enhancing the Lifespan of Flash Memory based Solid State Devices"< FAST'11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14https://www.syncids.com/#.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime, "Design, Automation & Text in Europe Conference & Exhibition (Date), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

C. Wu, D. Wu, H. Chou and C. Cheng, "Rethink the Design of Flash Translation Layers in a Component-Based View", in IEEE Acess, vol. 5, pp. 12895-12912, 2017.

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

Arm ("Cortex-R5 and Cortex-R5F", Technical reference Manual, Revision r1p1) (Year:2011).

\* cited by examiner

METHOD AND SYSTEM FOR ENHANCING A DISTRIBUTED STORAGE SYSTEM BY DECOUPLING COMPUTATION AND NETWORK TASKS

RELATED APPLICATION

This application is a continuation of U.S. patent application Ser. No. 16/515,889, titled "Method and System for Enhancing a Distributed Storage System By Decoupling Computation and Network Tasks," by inventor Shu Li, filed 18 Jul. 2019.

BACKGROUND

Field

This disclosure is generally related to the field of data storage. More specifically, this disclosure is related to a method and system for enhancing a distributed storage system by decoupling computation and network tasks.

Related Art

The proliferation of the Internet and e-commerce continues to create a vast amount of digital content. Various distributed storage systems have been created to access and store such digital content. In general, a distributed storage system can include computing entities/operations and storage entities/operations. The computing and storage functionality can be separated via a disaggregation or separation of the storage computation. For example, a storage node in a storage cluster of a distributed storage system can be designed to work with entities such as a multi-core powerful central processing unit (CPU), a high-capacity drive, and a high-throughput network. However, as each of these three entities experiences improvement and growth, the issue of synchronization among and between these three entities remains a challenge. For example, there may exist a disorder or mismatch between the evolution and deployment of these three entities in a distributed storage system, which can result in inconsistent behavior and performance in the distributed storage system.

SUMMARY

One embodiment provides a computer system. The computer system comprises: a plurality of storage devices; and a first component configured to manage connections to the plurality of storage devices. A respective storage device comprises: a port coupled to the first component; at least one microprocessor; and a plurality of storage drives with non-volatile memory.

In some embodiments, the computer system further comprises a computing device which includes the first component, a central processing unit, and a volatile memory.

In some embodiments, the computing device comprises a single integrated circuit.

In some embodiments, the central processing unit of the computing device is configured to perform one or more of: managing meta-data; placing data; scrubbing, refreshing, or deleting data; communicating with other computing devices via the first component; and handling multiple replicas of data.

In some embodiments, the computing device is configured to: receive a request to write data to a non-volatile memory of the computer system; and transmit the data, via the first component, to a selected storage device. The selected storage device is configured to write the data to a non-volatile memory of a first storage drive of the selected storage device.

In some embodiments, the computing device is further configured to: perform general computation tasks associated with the computer system; process, by the first component, the data to obtain processed data; and transmit the processed data, by the computing device via the first component, to the selected storage device. In writing the data to the non-volatile memory of the first storage drive of the selected storage device, the selected storage device is further configured to: determine, by a flash translation layer module of the selected storage device, the first storage drive of the selected storage device to which to write the processed data; perform, by a controller of the first storage drive, specific in-drive computation tasks on the processed data to obtain further processed data; and write, by the controller of the first storage drive, the further processed data to the non-volatile memory of the first storage drive.

In some embodiments, the computer system further comprises a second component functioning as the network interface card, the access switch, and a central processing unit.

In some embodiments, the first component is further configured to: process data, including operations relating to a cyclic redundancy check, a hash function, and encryption; handle network communication; and handle communication between a pod switch and the plurality of storage devices.

In some embodiments, the first component functions both as a network interface card and as an access switch, the port comprises an Ethernet port, and the respective storage device further comprises a plurality of PCIe lanes via which to access the plurality of storage drives. The at least one microprocessor and the PCIe lanes comprise a storage system on chip (SoC) component of the respective storage drive. The storage SoC component is configured to: manage the plurality of storage drives; and perform operations relating to a file system and a flash translation layer module associated with the storage drives.

In some embodiments, a controller of a respective storage drive is configured to perform one or more of: erasure coding; compression; sorting; and filtering.

BRIEF DESCRIPTION OF THE FIGURES

In the figures, like reference numerals refer to the same figure elements.

DETAILED DESCRIPTION

Figure 1:
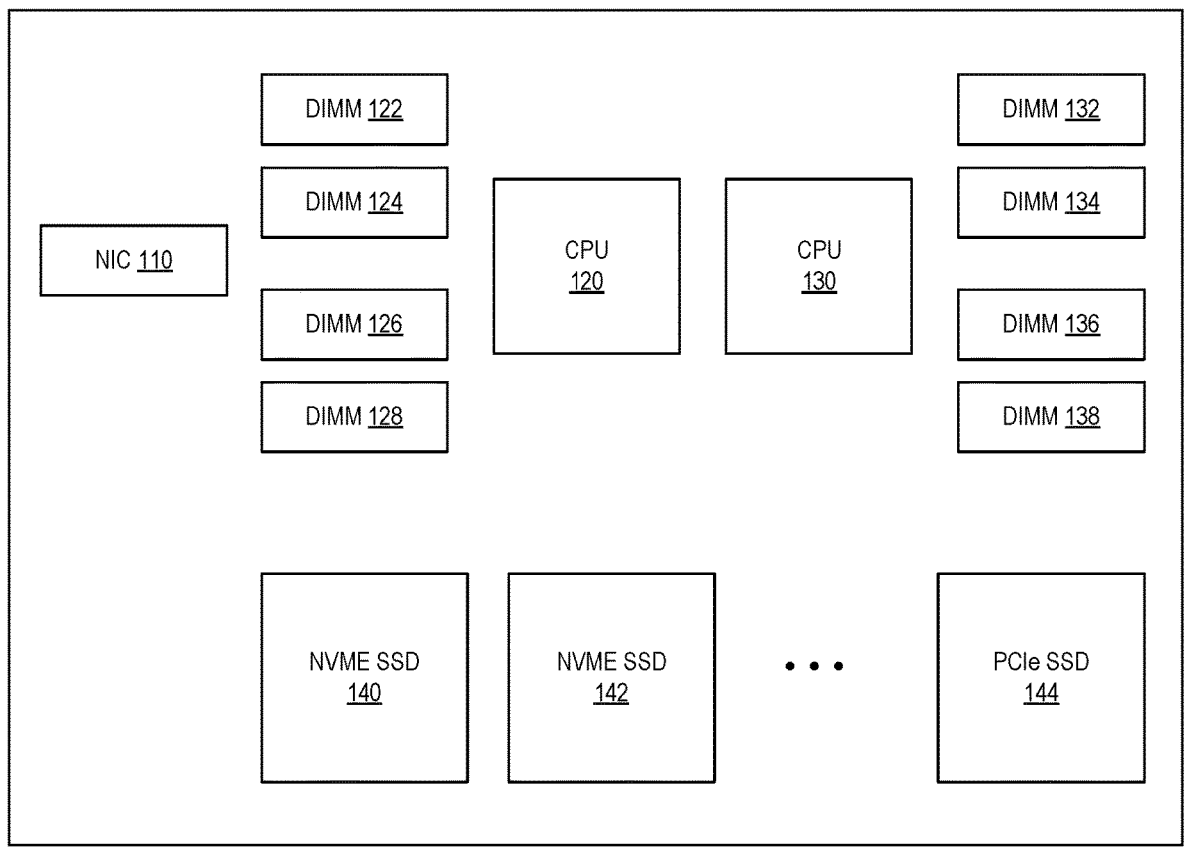
FIG. 1 illustrates an exemplary environment for facilitating data access in a computer system, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the challenges of performance mismatch between and among the CPU, the storage drive, and networking in a distributed storage system, by providing a system which decouples the computing, capacity, and bandwidth in a storage server. The system can provide the flexibility necessary for a scalable and module distributed system with reduced constraints.

As described above, a distributed storage system can include computing entities/operations and storage entities/operations. The computing and storage functionality can be separated via a disaggregation or separation of the storage computation. For example, a storage node in a storage cluster of a distributed storage system can be designed to work with entities such as a multi-core powerful CPU, a high-capacity drive, and a high-throughput network. However, as each of these three entities has experiences improvement and growth, the issue of synchronization among and between these three entities remains a challenge. For example, there may exist a disorder or mismatch between the evolution and deployment of these three entities in a distributed storage system, which can result in inconsistent behavior and performance in the distributed storage system.

Furthermore, existing distributed storage systems may also suffer from the following constraints. First, the process of adding more storage drives to a storage node is limited by the number of PCIe lanes available and that can be provided by a CPU. Second, if a storage node may only have a fixed number of PCIe lanes, the throughput of the drives in the storage node is limited. As the capacity of one server increases, the input/output per second per gigabyte (IOPS/GB) decreases. Third, as the throughput of a network interface card (NIC) and the network both increase (e.g., from 10 GB to 25 GB to 50 GB and to 100 GB), the network bottleneck is significantly reduced, but the bottleneck may remain or move to the throughput of the drive itself. Fourth, using an open-channel solid state drive (SSD) may result in an advantage or improvement in the Quality of Service (QoS) and performance, but may also increase the utilization of the CPU and the memory on the host side, which can result the CPU to rely on or use more cores, which can lead to an increased cost.

The embodiments described herein address these challenges and constraints by providing a "FrontTop" device which includes a "combination NIC" and is coupled to a plurality of "bricks." In the conventional distributed storage system, a front-end computing device generally includes a NIC for communicating with an access switch (ASW) (which in turn communicates with a pod switch (PSW), etc.) In the embodiments described herein, the FrontTop device instead includes a combination NIC (or a "combo NIC"), which merges the prior ASW and NIC functionality. The combo NIC can provide Ethernet ports with which to connect to the Ethernet ports of each brick, and each brick can include a storage system on chip (SoC) and multiple storage drives (e.g., SSDs, open-channel SSDs, Alibaba Open-Channel (AOC) SSDs, and the like). An exemplary environment depicting the FrontTop device and the plurality of bricks is described below in relation to FIGS. 2A, 2B, 3A, and 3B, and exemplary task assignments in such an exemplary environment are described below in relation to FIG. 5.

Thus, by decoupling the computation, capacity, and bandwidth in a storage server of a distributed storage system, the embodiments described herein can provide more consistent behavior and performance in the distributed storage system, and can result in a more efficient method for deploying storage in a data center. These can result in an increased QoS, and can also result in a more modular and scalable deployment of the storage capacity in a distributed storage system, which can result in a reduced total cost of operation (TCO).

A "storage server" or a "storage node" refers to a computing device which can include multiple storage drives. A distributed storage system can include multiple storage servers.

A "brick" refers to a storage device which includes a storage SoC controller, Ethernet ports, and PCIe lanes which are coupled to a plurality of storage drives, e.g., SSDs, AOC SSDs, and other open-channel SSDs. Each storage drive can include its own controller, e.g., an SSD controller, an AOC SSD controller, etc.

A "combination NIC" or a "combo NIC" refers to a NIC which merges the functionality of an access switch (ASW) (by communicating with upstream or higher level entities, such as a pod switch (PSW)) and the functionality of a conventional NIC (by communicating with the plurality of downstream storage drives or bricks as described in this disclosure).

The terms "FrontTop" device and "Front-Top" device are used interchangeably in this disclosure, and refer to a computing device which includes a combo NIC, memory, and a CPU. A FrontTop device can communicate with a plurality of bricks via Ethernet ports provided by the combo NIC. In some instances, the term "FrontTop" is used in this disclosure, while in other instances (e.g., the Figures) the term "FRONT-TOP" is used.

A "storage drive" refers to a device or a drive with a non-volatile memory which can provide persistent storage of data, e.g., a solid state drive (SSD) or a hard disk drive (HDD). Examples of SSDs include open-channel SSDs.

Exemplary Environment for Data Access in the Prior Art

FIG. 1 illustrates an exemplary environment 100 for facilitating data access in a computer system, in accordance with the prior art. Environment 100 can comprise a storage system or a storage server, and can include: a network interface card (NIC) 110; central processing units (CPUs) 120 and 130; a plurality of dual in-line memory modules (DIMMs) 122, 124, 126, and 128, and 132, 134, 136, and 138, corresponding in some embodiments respectively to CPUs 120 and 130; and a plurality of non-volatile memory express (NVMe) and Peripheral Component Interconnect Express (PCIe) solid state drives (SSDs), including NVMe SSD 140, NVMe SSD 142, and PCIe SSD 144.

As described above, this conventional environment can result in challenges relating to performance, lifespan, scalability, and cost. First, the process of adding more storage drives to a storage node is limited by the number of PCIe lanes available and that can be provided by a CPU. Second, if a storage node may only have a fixed number of PCIe lanes, the throughput of the drives in the storage node is limited. As the capacity of one server increases, the input/output per second per gigabyte (IOPS/GB) decreases. Third, as the throughput of a NIC and the network both increase (e.g., from 10 GB to 25 GB to 50 GB and to 100 GB), the network bottleneck is significantly reduced, but the bottleneck may remain or move to the throughput of the drive itself. Fourth, using an open-channel SSD may result in an advantage or improvement in the Quality of Service (QoS) and performance, but may also increase the utilization of the CPU and the memory on the host side, which can cause the CPU to rely on or use more cores, which in turn can lead to an increased TCO.

Figure 2A:
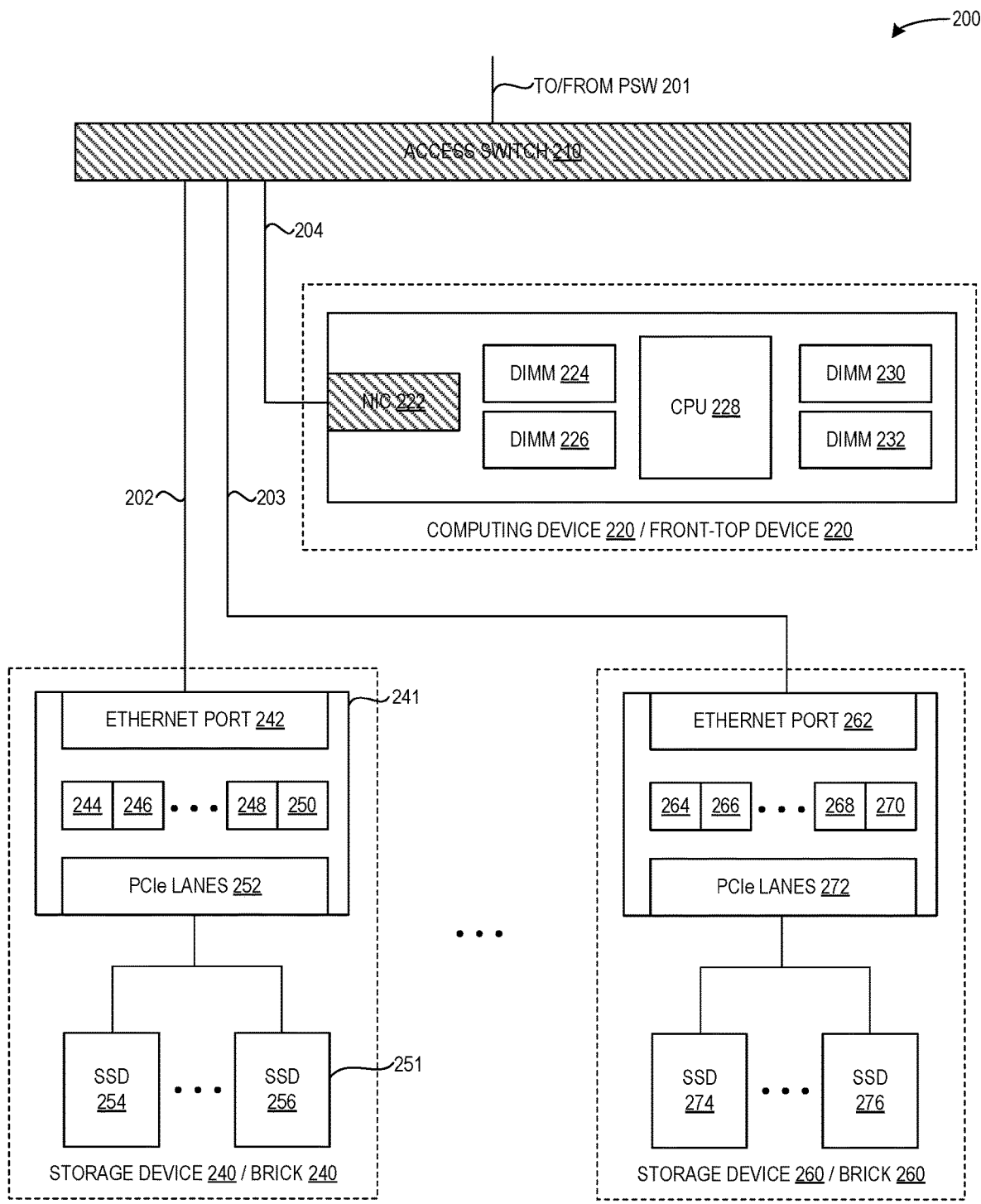
FIG. 2A illustrates an exemplary environment for facilitating data access in a computer system, in accordance with an embodiment of the present application.

Exemplary Environment for Facilitating Data Access Using a FrontEnd which Includes a Combo NIC Connected to Multiple Bricks FIG. 2A illustrates an exemplary environment for facilitating data access in a computer system, in accordance with an embodiment of the present application. Environment 200 includes a computing device 220/FrontTop device 220 and a plurality of storage devices/bricks, such as a storage device 240/brick 240 and a storage device 260/brick 260.

Computing device 220 can include: a NIC 222; a CPU 228; and DIMMs 224, 226, 230, and 232. Computing device 220 can communicate with an access switch 210 via NIC 222. Access switch 210 can handle communications to/from a pod switch (via a communication 201). Storage devices 240 and 260 can communicate with access switch 210 via an Ethernet port (e.g., an Ethernet port 242 and an Ethernet port 262, respectively). In environment 200, NIC 222 and access switch 210 are depicted as shaded with left-slanting diagonal lines to indicate that computing device 220 includes a first component which is a combination NIC ("combo NIC") that merges the functionality of NIC 222 and access switch 210 (as depicted in detail below in FIG. 2B).

Storage device 240 can include: Ethernet port 242 coupled to computing device 220; at least one microprocessor (such as 244, 246, 248, and 250); PCIe lanes 252; and a plurality of storage drives with non-volatile memory (such as SSDs 254 and 256). PCIe lanes 252 can be used for communication with and data transfer to/from SSDs 254-256. Similarly, storage device 260 can include: Ethernet port 262 coupled to computing device 220; at least one microprocessor (such as 264, 266, 268, and 270); PCIe lanes 272; and a plurality of storage drives with non-volatile memory (such as SSDs 280 and 282). PCIe lanes 272 can be used for communication with and data transfer to/from SSDs 274-276. In some embodiments, SSDs 254, 256, 274, and 276 can be open-channel SSDs.

Figure 2B:
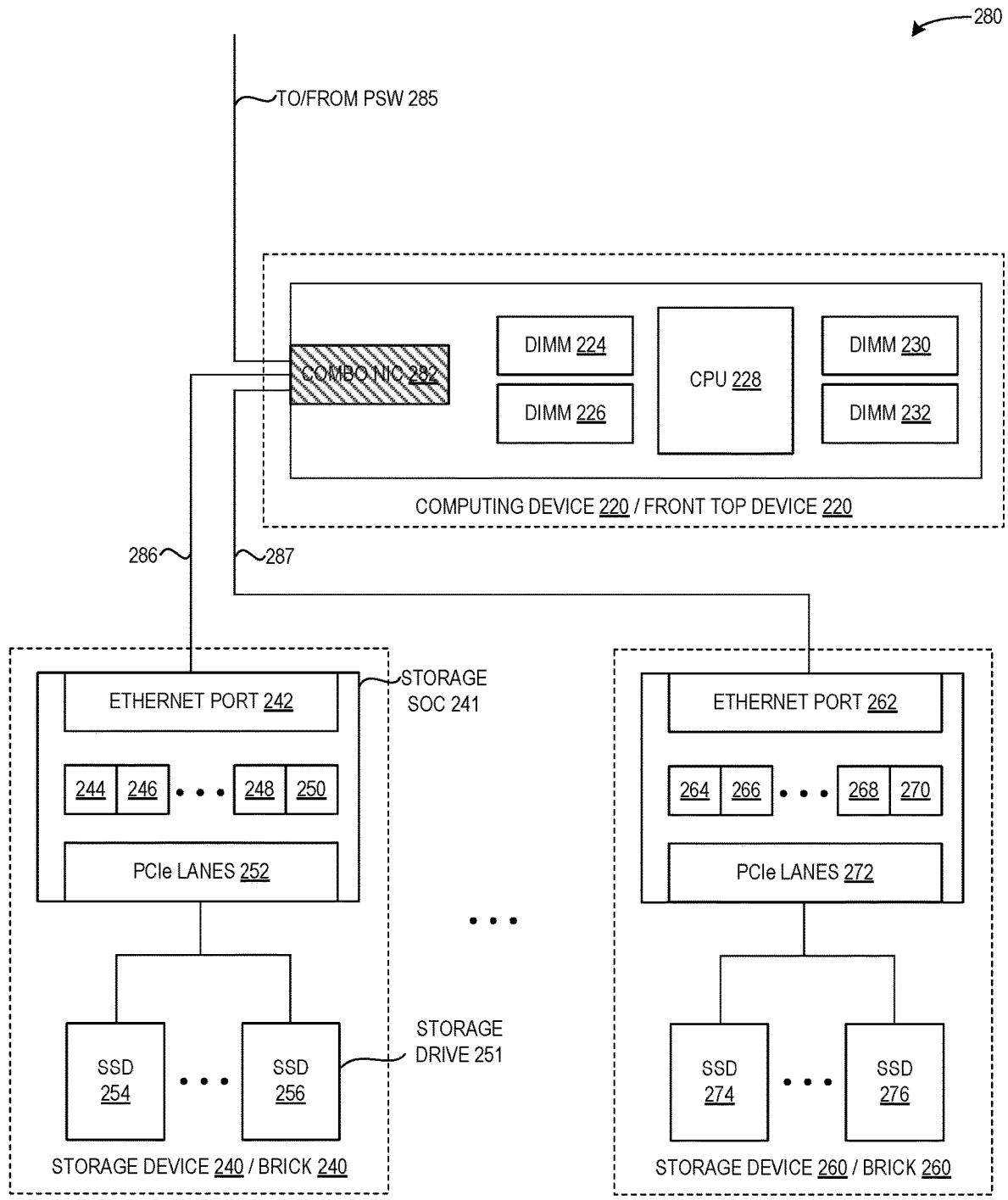
FIG. 2B illustrates an exemplary environment for facilitating data access in a computer system, in accordance with an embodiment of the present application.

FIG. 2B illustrates an exemplary environment 280 for facilitating data access in a computer system, in accordance with an embodiment of the present application. Environment 280 is similar to environment 200, but more clearly depicts a combo NIC 282 as the first component of computing device 220. Combo NIC 282 of environment 280 functions as both access switch 210 and NIC 222 of environment 200. Specifically: functioning as the access switch, combo NIC 282 handles the communications to/from the pod switch (via a communication 285) and further handles the communications to/from storage devices 240 and 260 (via, respectively, communications 286 and 287); and functioning as the NIC, combo NIC 282 can handle the NIC function for computing device 220.

Figure 3A:
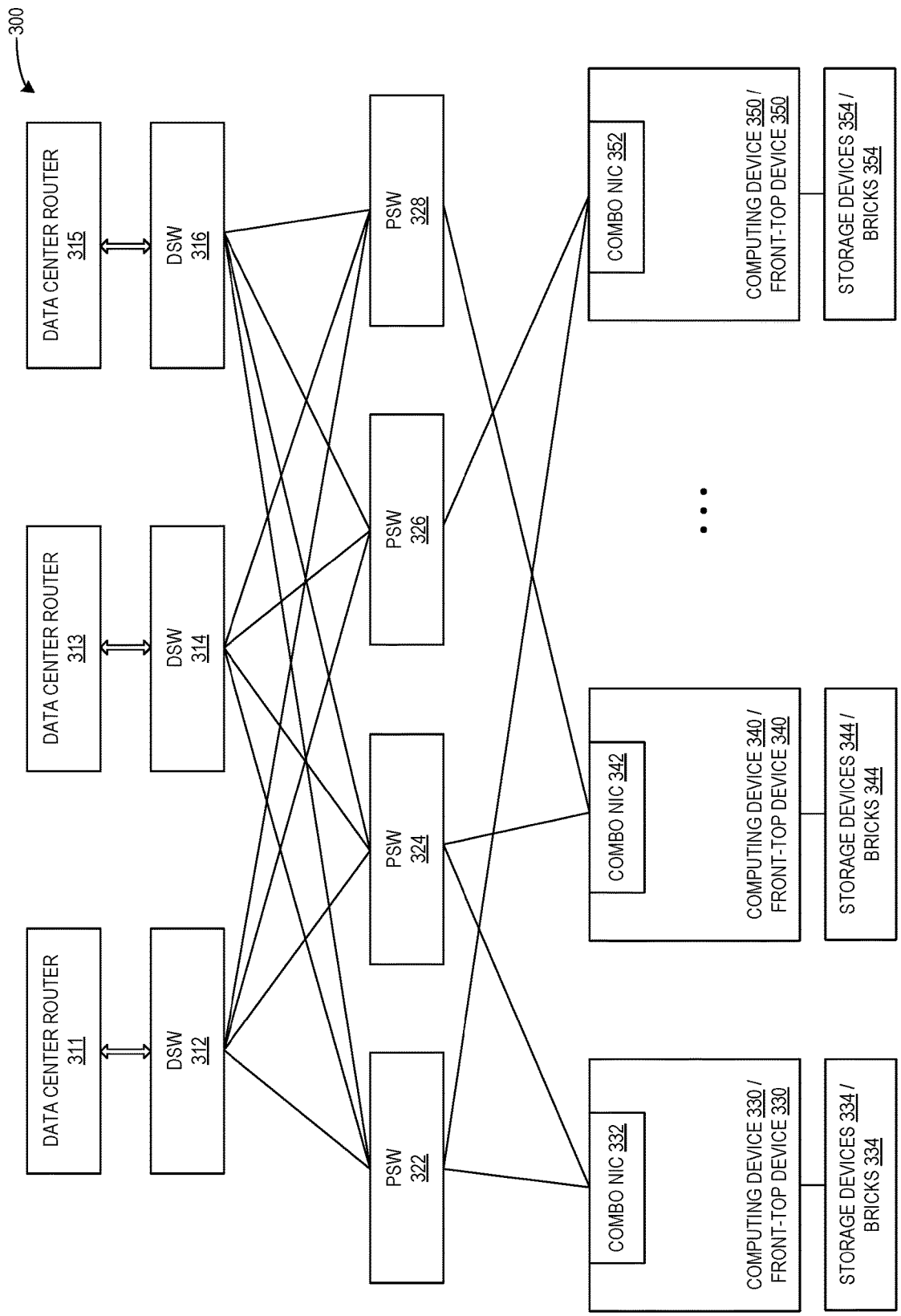
FIG. 3A illustrates an exemplary network topology for facilitating data access in a computer system, in accordance with an embodiment of the present application.

FIG. 3A illustrates an exemplary network topology 300 for facilitating data access in a computer system, in accordance with an embodiment of the present application. Topology 300 can represent a distributed storage system, and can include: several data center switches (DSWs) 312, 314, and 316, which communicate with, respectively, data center routers 311, 313, and 315; pod switches (PSWs) 322, 324, 326, and 328, which handle communication between a plurality of computing devices (330, 340, and 350) and DSWs (312, 314, and 316); a plurality of computing devices (FrontTop devices) 330, 340, and 350; and a plurality of storage devices (bricks) 334, 344, and 354.

Each FrontTop device can include a combo NIC and can be coupled to a plurality of storage devices (bricks). Each FrontTop device, via its combo NIC, can be coupled or connected to two PSWs for upstream communication, and can be further coupled or connected to a plurality of storage devices (bricks) for downstream communication. Because the combo NIC connects directly to the two PSWs, the overall network path is shortened, which can result in a decrease in latency. At the same time, the system can avoid congestion on the access switch because the functionality of the former ASW can be distributed among multiple combo NICs.

For example, computing device 330/FrontTop device 330 can include a combo NIC 332, can be coupled upstream to PSW 322 and PSW 324, and can further be coupled downstream to storage devices 334/bricks 334. Similarly: computing device 340/FrontTop device 340 can include a combo NIC 342, can be coupled upstream to PSW 324 and PSW 328, and can further be coupled downstream to storage devices 344/bricks 344; and computing device 350/FrontTop device 350 can include a combo NIC 352, can be coupled upstream to PSW 322 and PSW 326, and can further be coupled downstream to storage devices 354/bricks 354.

In topology 300, each FrontTop device is responsible for running software for the distributed storage system and for handling the network connection (via its respective combo NIC), while the storage device (brick) itself is responsible for managing the storage drives. In some embodiments, the FrontTop device is implemented as a powerful SoC in order to realize the functionality and responsibility of the FrontTop device. That is, the whole set of the FrontTop's function may be implemented using one integrated circuit given a sufficient set of CPU cores, bandwidth for the network controller, and physical memory. The embodiments described herein can integrate the memory controller to expand the memory space, which significantly simplifies the storage server, and can result in a more efficient overall distributed storage system.

Figure 3B:
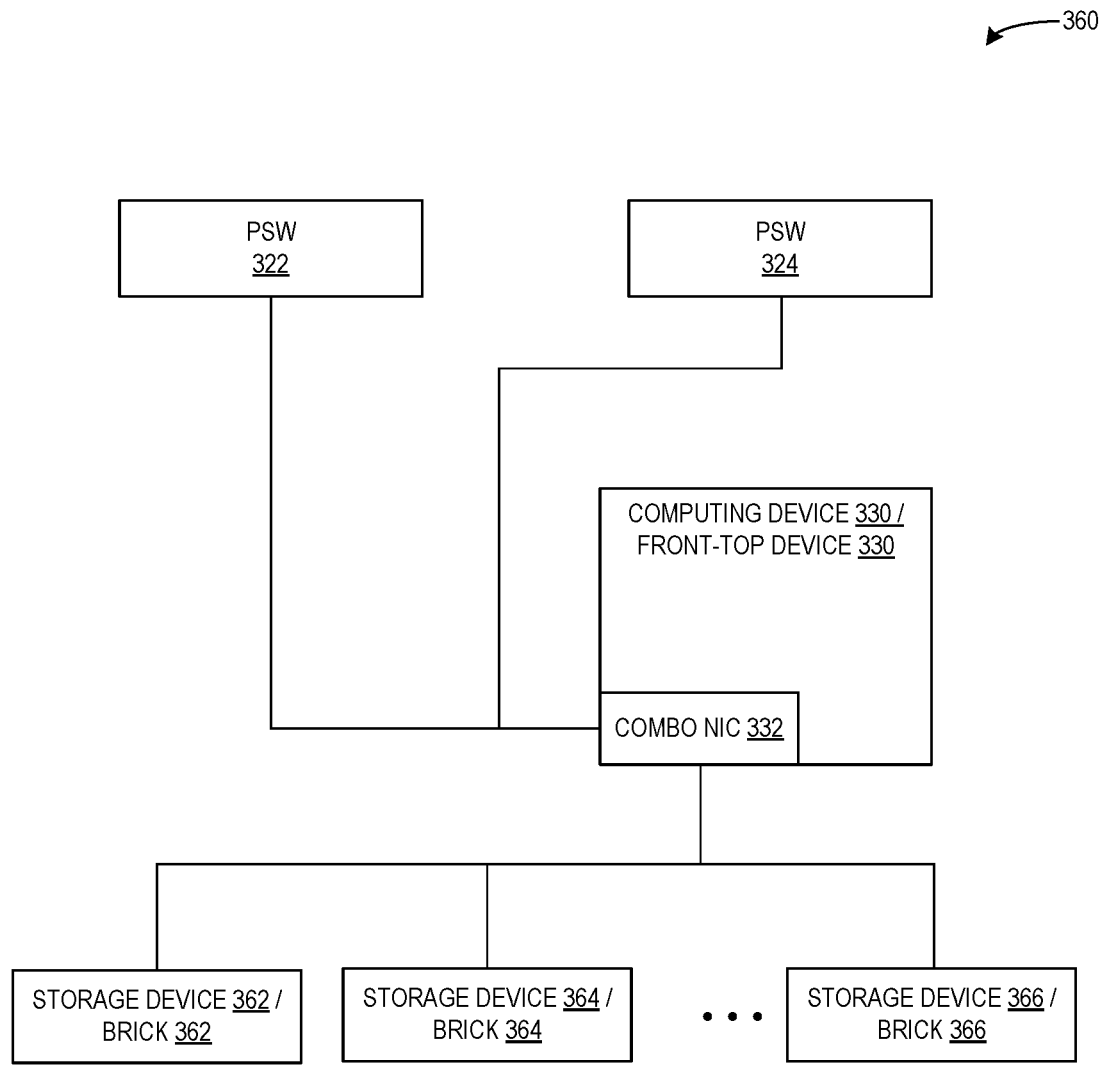
FIG. 3B illustrates an exemplary environment for facilitating data access in a computer system, including the addition of bricks coupled to a FrontTop device, in accordance with an embodiment of the present application.

FIG. 3B illustrates an exemplary environment 360 for facilitating data access in a computer system, including the addition of bricks coupled to a FrontTop device, in accordance with an embodiment of the present application. Environment 360 can include PSWs 322 and 324, which are communicatively coupled to computing device 330 (FrontTop device 330). Computing device 330 can include combo NIC 332, which handles the communication both to PSWs 322 and 324, and to a plurality of storage devices/bricks (362, 364, and 366, which are represented as bricks 334 in FIG. 3A).

Thus, in the embodiments described herein, by placing in a FrontTop computing device a combination NIC which functions both as a NIC and an access switch, the system can add storage devices (bricks) which include multiple storage drives (e.g., SSDs) in a modular and scalable fashion. This allows the system to decouple networking tasks from computation tasks (as described below in relation to FIG. 4), which can result in a distributed storage system with more consistent behavior and performance. The system can also provide an increased QoS and a reduced TCO.

Exemplary Task Assignment in a Computer System

Figure 4:
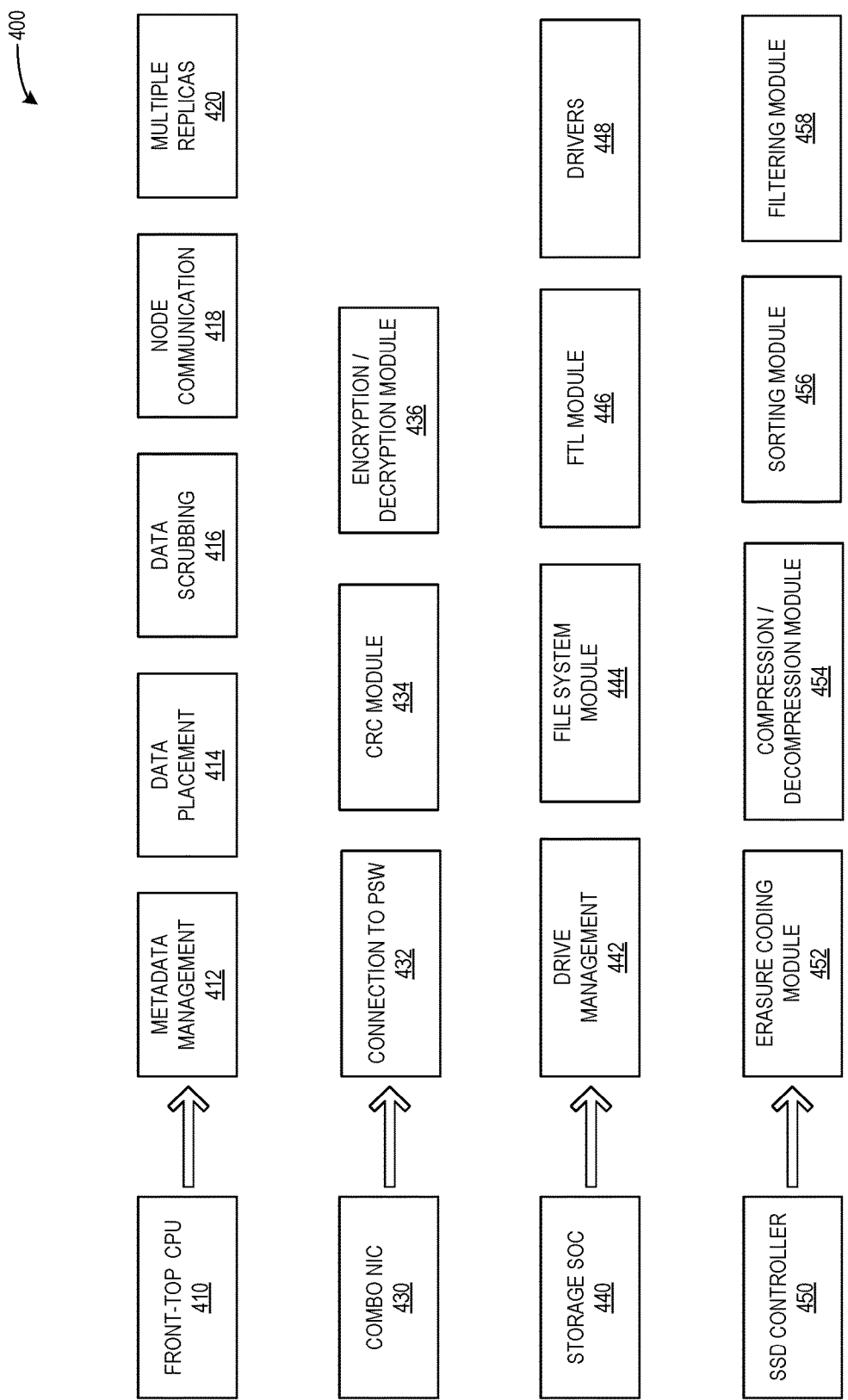
FIG. 4 illustrates an exemplary task assignment in a computer system, in accordance with an embodiment of the present application.

FIG. 4 illustrates an exemplary task assignment 400 in a computer system, in accordance with an embodiment of the present application. Given the environments and network topology of FIGS. 2A, 2B, 3A, and 3B, the embodiments described herein can include modules which handle certain tasks (e.g., task assignment). These tasks can be distributed among a FrontTop CPU 410, a combo NIC 430, a storage SoC 440, and an SSD controller 450. FrontTop CPU 410 can correspond to CPU 228 of computing device 220 of FIG. 2B, and can provide the significant computing resource for the distributed storage system. FrontTop CPU 410 can include modules and functionality for performing: metadata management 412; data placement 414; data scrubbing 416; node communication 418; and handling multiple replicas 420.

Combo NIC 430 can correspond to combo NIC 282 of FIG. 2B, and can serve as the ASW and the NIC for the FrontTop device. Combo NIC 430 can include modules and functionality for: handling network communication, such as a connection to PSW 432 (as well as handling communication between a pod switch and a plurality of storage devices, not shown); processing data, such as a CRC module 434 (as well as other operations, including a hash function or other hash-related operations); and performing encryption/decryption via an encryption/decryption module 436. Some of these functions of combo NIC 430 may be offloaded from various other components of the distributed storage system.

Storage SoC 440 can correspond to storage SoC 241 of FIG. 2B, and can share a high-efficiency data I/O path by working on the management of the storage drives. Storage SoC 440 can include modules and functionality for performing: drive management 442 (e.g., managing the plurality of storage drives); file system management via a file system module 444; operations relating to a flash translation layer (FTL) module 446; and operations associated with various drivers 448. For example, the FTL for an open-channel SSD can run on the storage SoC of the storage device (brick) with a DRAM interface for expanding the physical DRAM capacity.

SSD controller 450 can correspond to an SSD controller (not shown) for storage drive 251 of FIG. 2B, and can provide in-storage processing via a processor through, e.g., a field-programmable gate array (FPGA) packaged with the SSD controller. SSD controller 450 can include various modules with functionality, including but not limited to: an erasure coding module 452; a compression/decompression module 454; a sorting module 456; and a filtering module 458. Using an FPGA with the flexibility of re-programming can provide the freedom to configure and implement the logic based on specific application scenarios. An open-channel SSD, for example, can include in-storage processing which can service a much broader potential range of users, user needs, and specific applications.

Thus, in the embodiments described herein, the system can assign various computational tasks to multiple levels. Offloading the compute operations into the SSD itself can achieve the goal of in-storage computing, and placing the local storage engine in the storage SoC of each storage device (brick) can result in a flexible organization for the storage device as a resource. Furthermore, placing the network efficiency as well as certain computational tasks (such as encryption and parity checks) into the combo NIC can result in a more efficient system. As a result, the system provides a design for a storage server in a distributed storage system or cluster which can result in a more agile and efficient environment, by renovating and balancing the computation, network, and storage tasks within the distributed storage system or cluster. The system can also be configured into a finer-grained granularity to allocate resources with improved flexibility and to reduce the influencing range of online faults.

In another embodiment, the system can merge the standalone CPU of the FrontTop device with the combo NIC as a single SoC, as described below in relation to FIG. 5.

Exemplary Converged SoC Design for FrontTop Device

Figure 5:
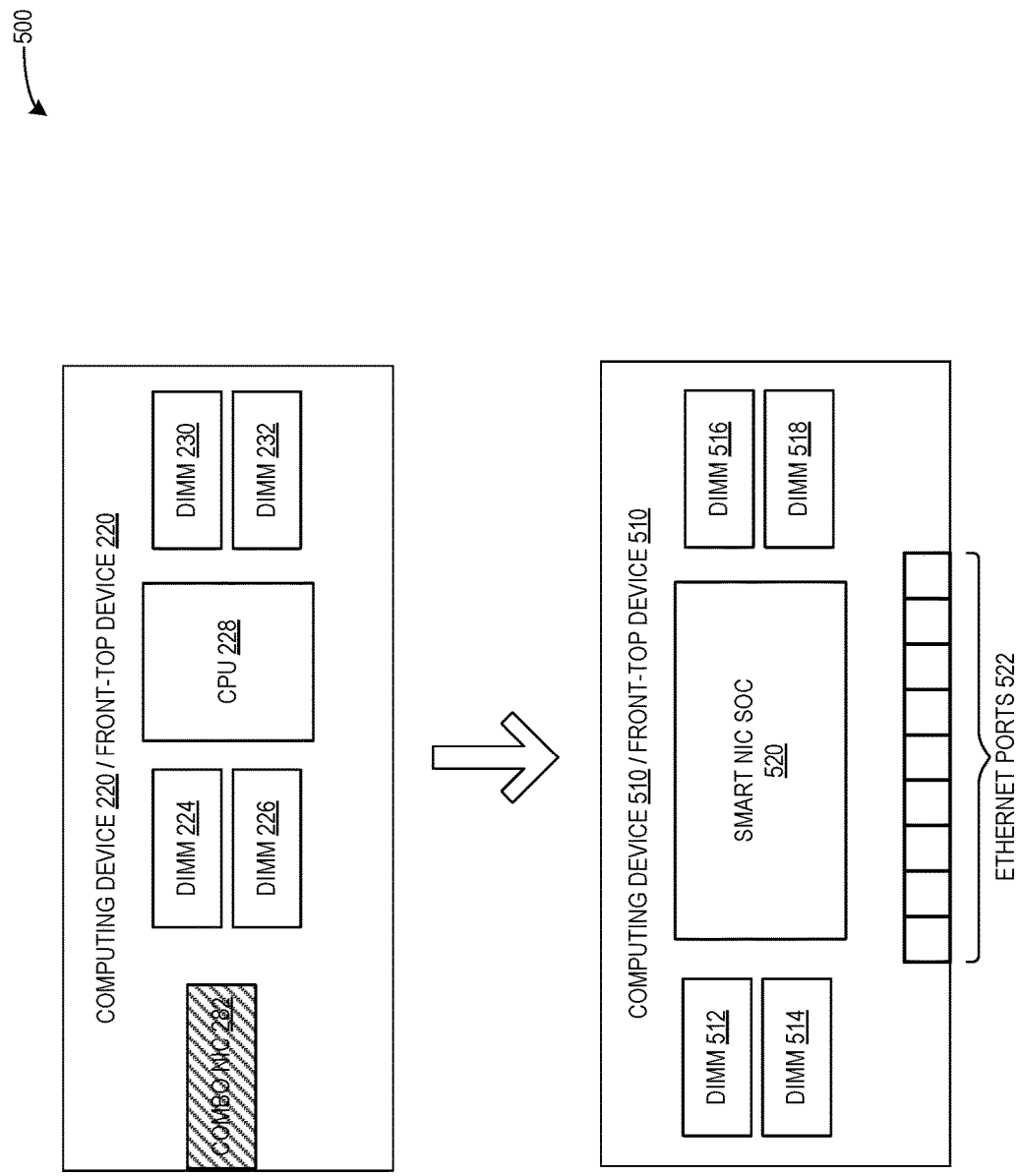
FIG. 5 illustrates an exemplary converged SoC design for a FrontTop device, in accordance with an embodiment of the present application.

FIG. 5 illustrates an exemplary converged SoC design for a FrontTop device 510 in an environment 500, in accordance with an embodiment of the present application. Environment 500 depicts computing device 220/FrontTop device 220 which includes combo NIC 282, as described above in relation to FIG. 2B. The system can merge standalone CPU 228 of computing device 220 with combo NIC 282 into a smart NIC SoC, resulting in a computing device 510/FrontTop device 510, which includes: a smart NIC SoC 520; various DIMMs 512, 514, 516, and 518; and a set of Ethernet ports 522. As a result, smart NIC SoC 520 is configured to function or operate as the NIC, the access switch, and the CPU for computing device 510.

Exemplary Method for Facilitating Data Access in a Computer System

Figure 6A:
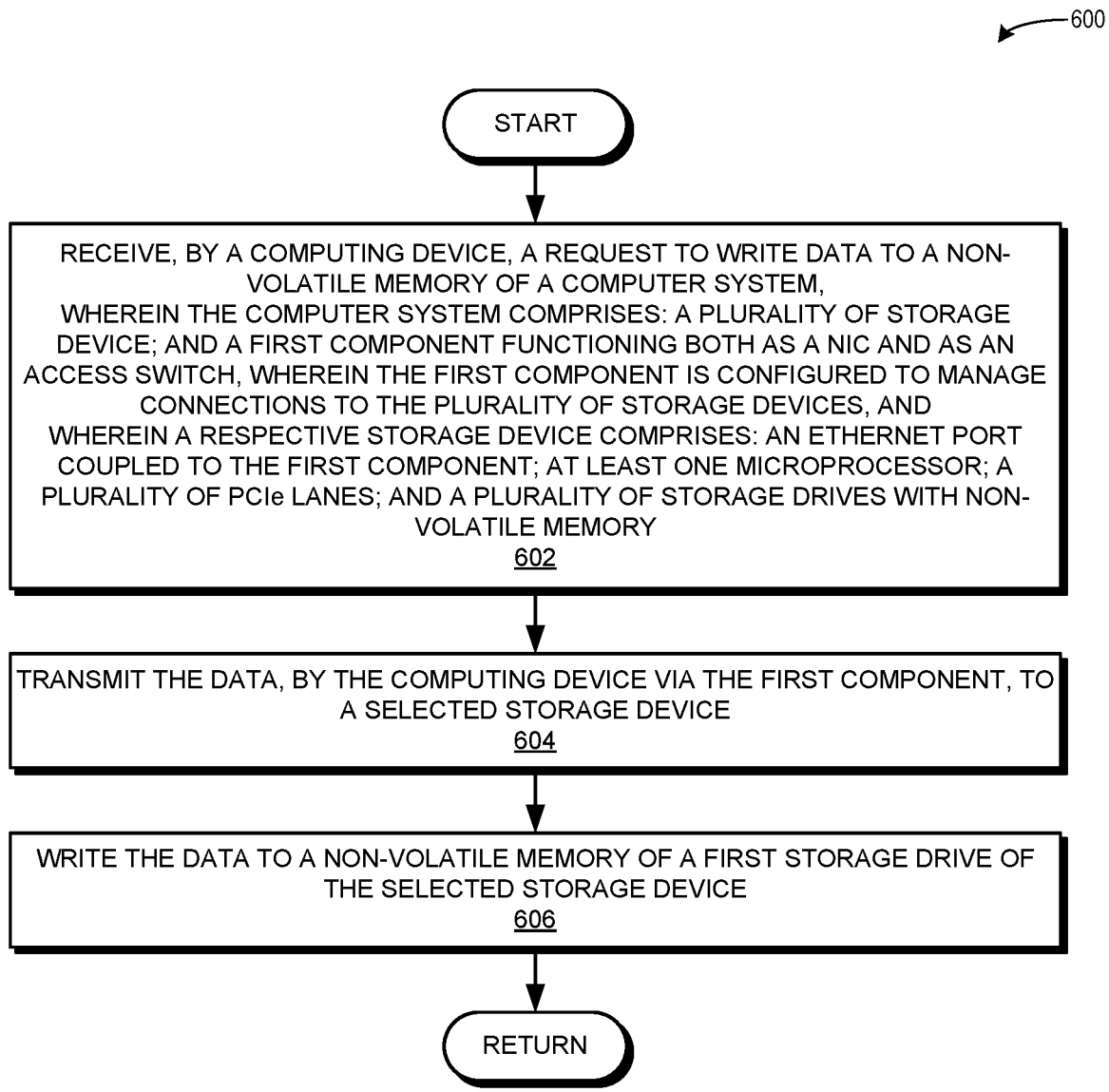
FIG. 6A presents a flowchart illustrating a method for facilitating data access in a computer system, in accordance with an embodiment of the present application.

FIG. 6A presents a flowchart 600 illustrating a method for facilitating data access in a computer system, in accordance with an embodiment of the present application. During operation, the system receives, by a computing device, a request to write data to a non-volatile memory of a computer system, wherein the computer system comprises: a plurality of storage devices; and a first component functioning both as a network interface card and as an access switch, wherein the first component is configured to manage connections to the plurality of storage devices, and wherein a respective storage device comprises: an Ethernet port coupled to the first component; at least one microprocessor; a plurality of PCIe lanes; and a plurality of storage drives with non-volatile memory (operation 602). The system transmits the data, by the computing device via the first component, to a selected storage device (operation 604). The system writes the data to a non-volatile memory of a first storage drive of the selected storage device (operation 606).

Figure 6B:
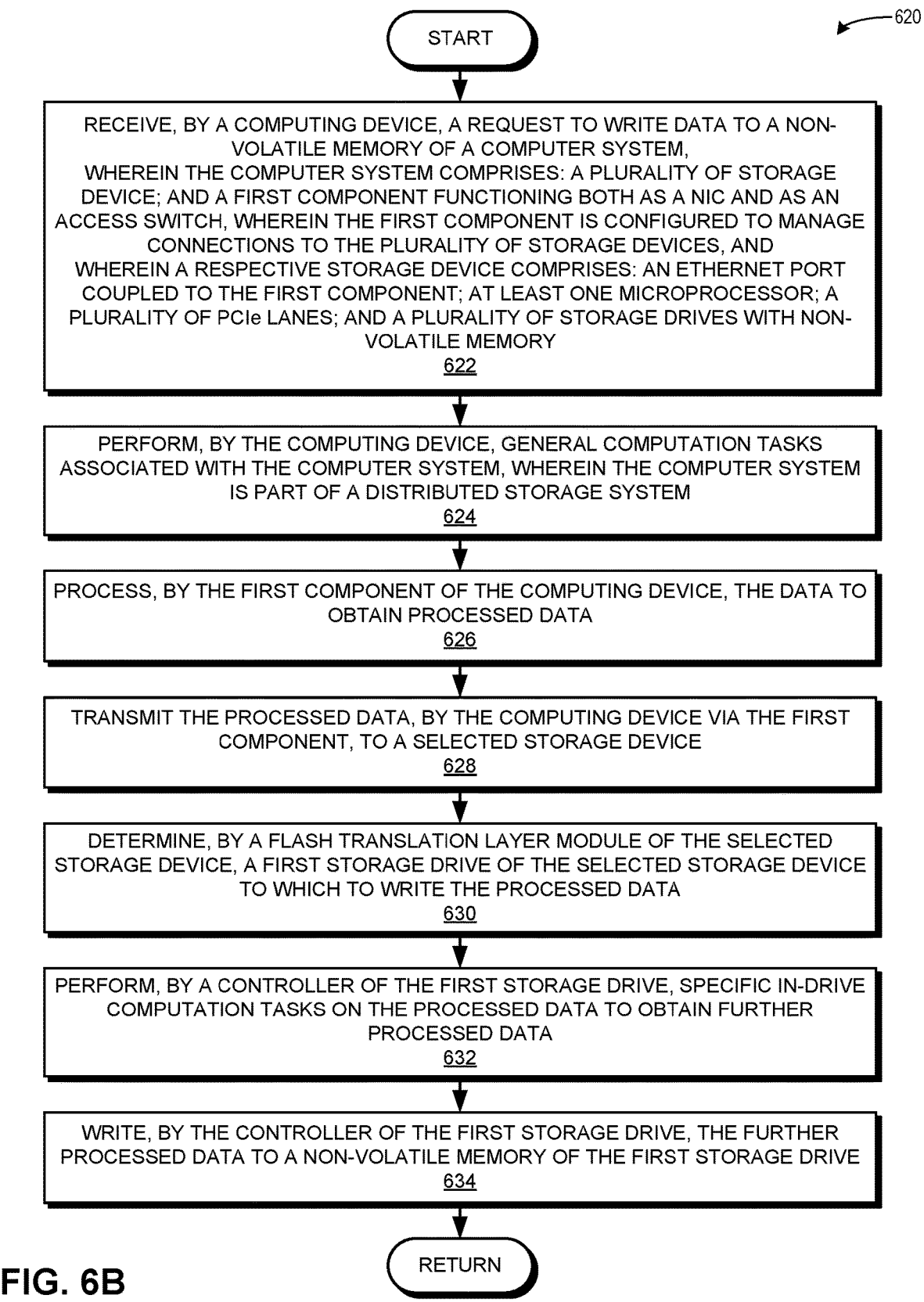
FIG. 6B presents a flowchart illustrating a method for facilitating data access in a computer system, in accordance with an embodiment of the present application.

FIG. 6B presents a flowchart illustrating a method for facilitating data access in a computer system, in accordance with an embodiment of the present application. During operation, the system receives, by a computing device, a request to write data to a non-volatile memory of a computer system, wherein the computer system comprises: a plurality of storage devices; and a first component functioning both as a network interface card and as an access switch, wherein the first component is configured to manage connections to the plurality of storage devices, and wherein a respective storage device comprises: an Ethernet port coupled to the first component; at least one microprocessor; a plurality of PCIe lanes; and a plurality of storage drives with non-volatile memory (operation 622). The system performs, by the computing device, general computation tasks associated with the computer system, wherein the computer system is part of a distributed storage system (operation 624). These general computation tasks can include, e.g., meta-data management, data placement, data scrubbing/refreshing/deleting, node communication, and handling replicas, as depicted above in relation to FrontTop CPU 410 of FIG. 4.

The system processes, by the first component of the computing device, the data to obtain processed data (operation 626). Processing the data can include, e.g., operations relating to a CRC check, a hash function, and encryption/decryption, as depicted above in relation to combo NIC 430 of FIG. 4. The system transmits the processed data, by the computing device via the first component, to a selected storage device (operation 628).

The system determines, by a flash translation layer module of the selected storage device, a first storage drive of the selected storage device to which to write the processed data (operation 630). The system can determine the first storage drive of the selected storage device based on a mapping table or other data structure maintained by the FTL module of the selected storage device. The FTL module can handle the mapping of logical addresses to physical addresses. The system performs, by a controller of the first storage drive, specific in-drive computation tasks on the processed data to obtain further processed data (operation 632). These in-drive computation tasks can include, e.g., erasure coding, compression/decompression, sorting, and filtering/re-filtering, as depicted above in relation to SSD controller 450 of FIG. 4. The system writes, by the controller of the first storage drive, the further processed data to a non-volatile memory of the first storage drive (operation 634).

While the methods and computer systems described in this disclosure for facilitating data access in a computer system depict handling an incoming write request, similar operations and components are employed in handling a read operation. The following describes the "read" version corresponding to a previously described operation of FIGS. 6A and 6B. For example, the system can receive a request to read data from a non-volatile memory of a computer system (read version of operation 602). The system can transmit the read request, by the computing device via the first component, to the selected storage device (or a storage device in which the data or a replica of the data is stored) (read version of operation 604). The system can read the data from the non-volatile memory of a first storage drive of the selected storage device (read version of operation 606).

Similarly, the system can perform the read version of the operations described above in relation to FIG. 6B, including, but not limited to: receiving a read request (read version of operation 622); performing general computation tasks (read version of operation 624); processing data as needed (read version of operation 626); transmitting the read request, by the computing device via the first component, to the selected storage device (or a storage device in which the data or a replica of the data is stored) (read version of operation 628); determining a location from a first storage drive from which to read the requested data (read version of operation 630); retrieving the data from the first storage drive at the determined location (read version of operation 634); and performing specific in-drive computation tasks to obtain decoded/decompressed/sorted/re-filtered data (read version of operation 632).

Exemplary Computer System and Apparatus

Figure 7:
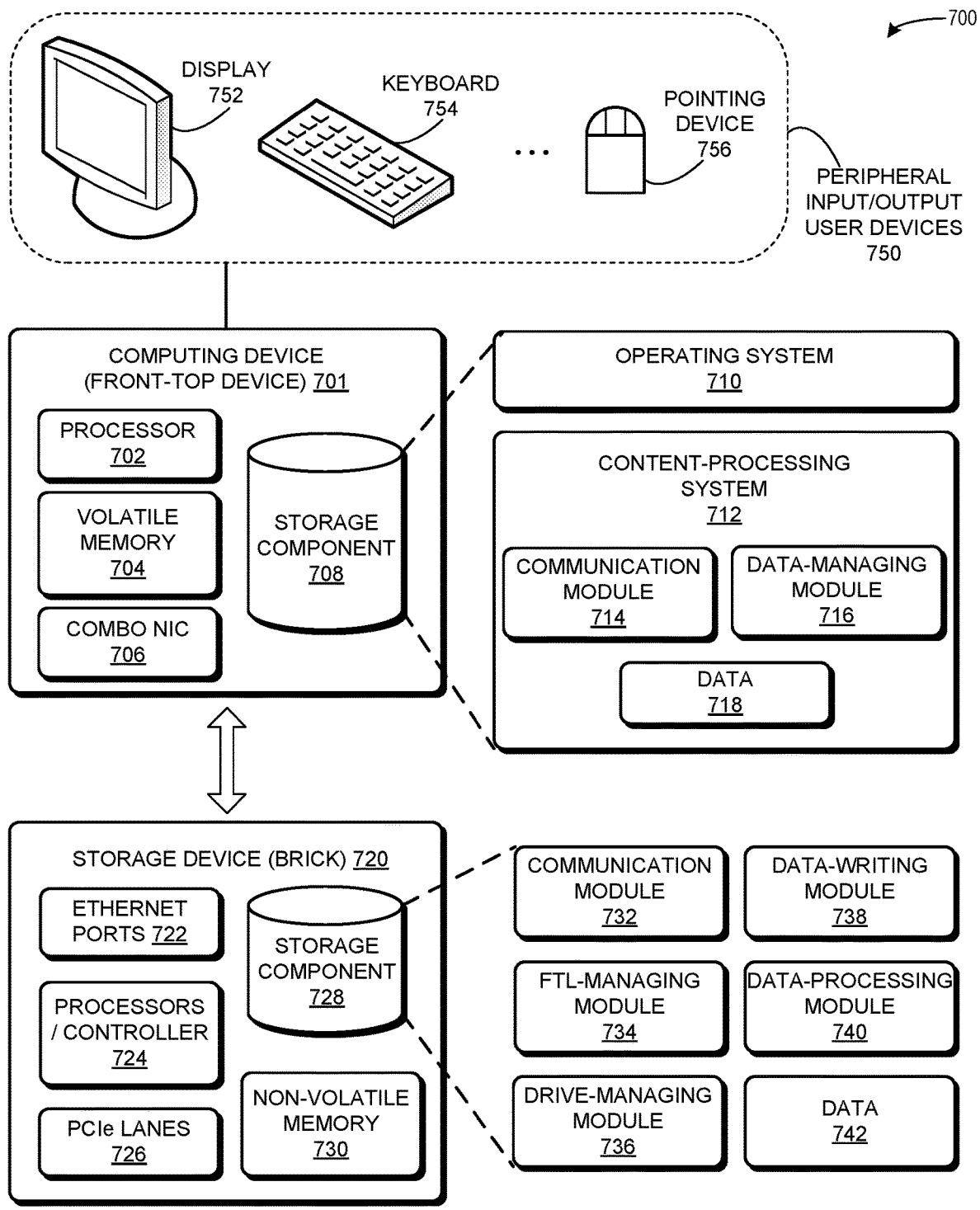
FIG. 7 illustrates an exemplary computer system and storage device that facilitates data access, in accordance with an embodiment of the present application.

FIG. 7 illustrates an exemplary computer system 700 that facilitates data access, in accordance with an embodiment of the present application. Computer system 700 can include a computing device (or a FrontTop device) 701 and a storage device (brick 720). Computing device 701 can include a processor 702, a volatile memory 704, a combo NIC 706, and a storage component 708. Computing device 701 can correspond to computing device 220 (FrontTop device 220) of FIG. 2B. Volatile memory 704 can include, e.g., random access memory (RAM), that serves as a managed memory, and can be used to store one or more memory pools. Combo NIC 706 can correspond to combo NIC 282 of FIG. 2B. Storage component 708 can include persistent storage. Furthermore, computing device 701 can be coupled to peripheral input/output (I/O) user devices 750, e.g., a display device 752, a keyboard 754, and a pointing device 756. Storage component 708 can store an operating system 710, a content-processing system 712, and data 718.

Content-processing system 712 can include instructions, which when executed by computing device 701, can cause computing device 701 to perform methods and/or processes described in this disclosure. Specifically, content-processing system 712 can include instructions for receiving and transmitting data packets, including data to be read or written, an input/output (I/O) request (e.g., a read request or a write request), and data associated with a read request, a write request, or an I/O request (communication module 714). Content-processing system 712 can also include instructions for receiving, by the computing device, a request to write data to a non-volatile memory of the computer system (communication module 714). Content-processing system 712 can include instructions for transmitting the data, by the computing device via the first component, to a selected storage device (communication module 714). Content-processing system 712 can include instructions for writing the data to a non-volatile memory of a first storage drive of the selected storage device (data-managing module 716).

Content-processing system 712 can include instructions for performing, by the computing device, general computation tasks associated with the computer system (data-managing module 716). Content-processing system 712 can include instructions for processing, by the first component, the data to obtain processed data (data-managing module 716). Content-processing system 712 can include instructions for transmitting the processed data, by the computing device via the first component, to the selected storage device (communication module 714).

Furthermore, content-processing system 712 can include instructions for: managing meta-data; placing data; scrubbing, refreshing, or deleting data; communicating with other computing devices via the first component; and handling multiple replicas of data (data-managing module 716). Content-processing system 712 can include instructions for processing data by the first component, including operations relating to a cyclic redundancy check, a hash function, and encryption (data-managing module 716). Content-processing system 712 can include instructions for handling, by the first component, network communication (communication module 714, functioning as part of combo NIC 706). Content-processing system 712 can include instructions for handling, by the first component, communication between a pod switch and the plurality of storage devices (communication module 714, functioning as part of combo NIC 706).

Storage device (brick) 720 can include Ethernet ports 722, processors/controller 724, PCIe lanes 726, a storage component 728, and a non-volatile memory 730. Storage component 728 can store instructions to be performed by processors/controller 724. Non-volatile memory 730 can correspond to or be associated with a storage drive, such as an SSD (e.g., corresponding to storage drive 251 of FIG. 2B).

Storage component 728 can include instructions for determining, by a flash translation layer module of the selected storage device, the first storage drive of the selected storage device to which to write the processed data (FTL-managing module 734). Storage component 728 can include instructions for performing, by a controller of the first storage drive, specific in-drive computation tasks on the processed data to obtain further processed data (data-processing module 740). Storage component 728 can include instructions for writing, by the controller of the first storage drive, the further processed data to the non-volatile memory of the first storage drive (communication module 732 and data-writing module 738).

Storage component 728 can include instructions for managing, by the storage SoC, the plurality of storage drives (communication module 732 and drive-managing module 736). Storage component 728 can include instructions for performing, by the storage SoC, operations relating to a file system and a flash translation layer module (communication module 732 and FTL-managing module 734). Storage component 728 can include instructions for performing, by a controller of a respective storage drive, one or more of: erasure coding; compression; sorting; and filtering (data-processing module 740).

Data 718 and data 742 can include any data that is required as input or generated as output by the methods and/or processes described in this disclosure. Specifically, data 718 and data 742 can store at least: data; a request; a read request; a write request; an input/output (I/O) request; data associated with a read request, a write request, or an I/O request; an erasure code (EC); encoded or decoded data; EC-encoded/decoded data; compressed or decompressed data; encrypted or decrypted data; sorted data; filtered or re-filtered data; meta-data; scrubbed, refreshed, or deleted data; a replica; an indicator of a pod switch, an access switch, a port, a PCIe lane, a computing device (or a FrontTop device), a storage device (or a brick), and a storage drive; a CRC verification; a hash function; an encryption algorithm; and a decryption algorithm.

Figure 8:
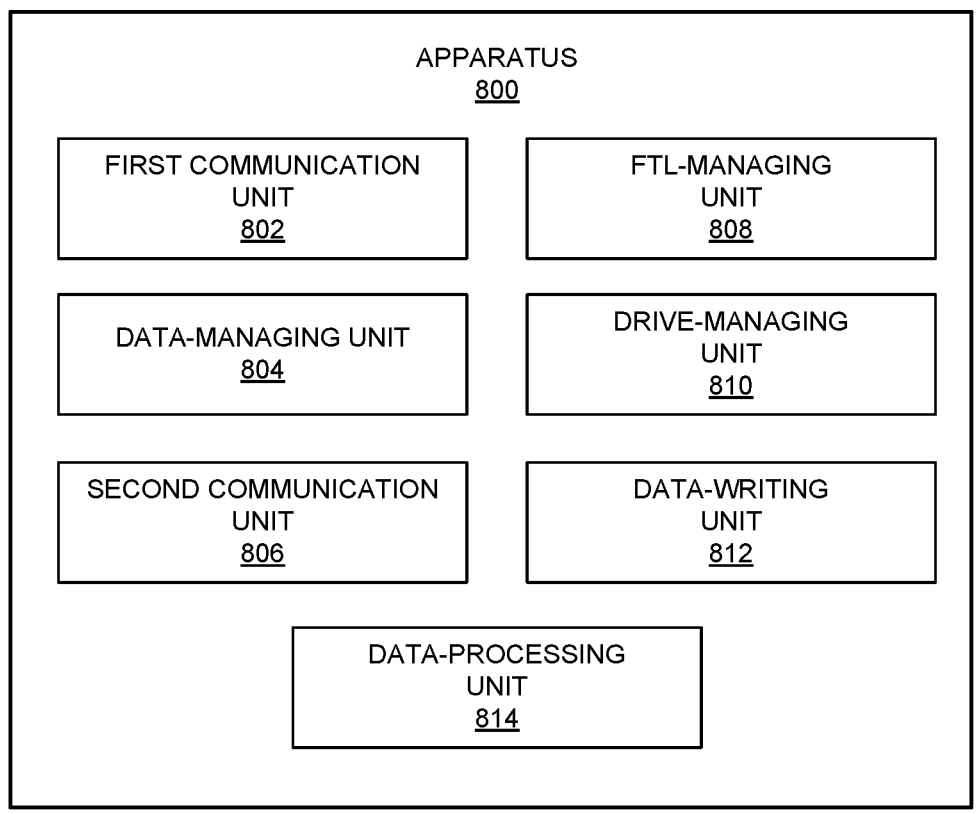
FIG. 8 illustrates an exemplary apparatus that facilitates data access, in accordance with an embodiment of the present application.

FIG. 8 illustrates an exemplary apparatus 800 that facilitates data access, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device(s) which is/are capable of communicating with other computer systems and/or devices. Specifically, apparatus 800 can comprise units 802-814 which perform functions or operations similar to modules 714, 716, and 732-740 of computer system 700 of FIG. 7, including: a first communication unit 802; a data-managing unit 804; a second communication unit 806; an FTL-managing unit 808; a drive-managing unit 810; a data-writing unit 812; and a data-processing unit 814.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer system, comprising:
   a plurality of storage devices; and
   a first component of a computing device, wherein the first component is configured to function both as a network interface card and as an access switch, by handling communications to and from a plurality of pod switches and by handling communications to and from the plurality of storage devices, which allows the computing device to communicate with the pod switches without a separate layer for the access switch, wherein the first component is coupled to a port on a respective storage device,
   wherein the respective storage device comprises: the port coupled to the first component; at least one microprocessor; a plurality of storage drives with non-volatile memory; and a plurality of PCIe lanes via which to access the plurality of storage drives, and
   wherein the port comprises an Ethernet port, wherein the at least one microprocessor and the PCIe lanes comprise a storage system on chip (SoC) component of the respective storage drive, and wherein the storage SoC component is configured to:
      manage the plurality of storage drives; and
      perform operations relating to a file system and a flash translation layer module associated with the storage drives.

2. The computer system of claim 1, further comprising:
   wherein the computing device includes the first component, a central processing unit, and a volatile memory.

3. The computer system of claim 2, wherein the computing device comprises a single integrated circuit.

4. The computer system of claim 2, wherein the central processing unit of the computing device is configured to perform one or more of:
   managing meta-data;

placing data;
scrubbing, refreshing, or deleting data;
communicating with other computing devices via the first component; and
handling multiple replicas of data.

5. The computer system of claim 2,
wherein the computing device is configured to:
receive a request to write data to a non-volatile memory of the computer system; and
transmit the data, via the first component, to a selected storage device; and
wherein the selected storage device is configured to:
write the data to a non-volatile memory of a first storage drive of the selected storage device.

6. The computer system of claim 5,
wherein the computing device is further configured to:
perform general computation tasks associated with the computer system;
process, by the first component, the data to obtain processed data; and
transmit the processed data, by the computing device via the first component, to the selected storage device.

7. The computer system of claim 6,
wherein in writing the data to the non-volatile memory of the first storage drive of the selected storage device, the selected storage device is further configured to:
determine, by a flash translation layer module of the selected storage device, the first storage drive of the selected storage device to which to write the processed data;
perform, by a controller of the first storage drive, specific in-drive computation tasks on the processed data to obtain further processed data; and
write, by the controller of the first storage drive, the further processed data to the non-volatile memory of the first storage drive.

8. The computer system of claim 1, further comprising:
a second component functioning as the network interface card, the access switch, and a central processing unit.

9. The computer system of claim 1, wherein the first component is further configured to:
process data, including operations relating to a cyclic redundancy check, a hash function, and encryption;
handle network communication; and
handle communication between a pod switch and the plurality of storage devices.

10. The computer system of claim 1, wherein a controller of a respective storage drive is configured to perform one or more of: erasure coding; compression; sorting; and filtering.

11. A computer-implemented method for facilitating data access in a computer system,
wherein the computer system comprises:
a plurality of storage devices;
a first component of a computing device, wherein the first component is configured to function both as a network interface card and as an access switch, by handling communications to and from a plurality of pod switches and by handling communications to and from the plurality of storage devices, which allows the computing device to communicate with the pod switches without a separate layer for the access switch, wherein the first component is coupled to a port on a respective storage device,
wherein the respective storage device comprises: the port coupled to the first component; at least one microprocessor; a plurality of storage drives with non-volatile memory; and a plurality of PCIe lanes via which to access the plurality of storage drives, and
wherein the port comprises an Ethernet port, wherein the at least one microprocessor and the PCIe lanes comprise a storage system on chip (SoC) component of the respective storage drive; and
the computing device which includes the first component,
wherein the method comprises:
receiving, by the computing device, a request to write data to a non-volatile memory of the computer system;
transmitting the data, by the computing device via the first component, to a selected storage device;
writing the data to a non-volatile memory of a first storage drive of the selected storage device;
managing, by the storage SoC component, the plurality of storage drives; and
performing, by the storage SoC component, operations relating to a file system and a flash translation layer module.

12. The method of claim 11, further comprising:
performing, by the computing device, general computation tasks associated with the computer system;
processing, by the first component, the data to obtain processed data; and
transmitting the processed data, by the computing device via the first component, to the selected storage device,
wherein writing the data to the non-volatile memory of the first storage drive of the selected storage device comprises:
determining, by a flash translation layer module of the selected storage device, the first storage drive of the selected storage device to which to write the processed data;
performing, by a controller of the first storage drive, specific in-drive computation tasks on the processed data to obtain further processed data; and
writing, by the controller of the first storage drive, the further processed data to the non-volatile memory of the first storage drive.

13. The method of claim 11, wherein the computing device includes the first component, a central processing unit, and a volatile memory.

14. The method of claim 13, wherein the computing device comprises a single integrated circuit.

15. The method of claim 13, wherein the central processing unit of the computing device performs one or more of:
managing meta-data;
placing data;
scrubbing, refreshing, or deleting data;
communicating with other computing devices via the first component; and
handling multiple replicas of data.

16. The method of claim 11, wherein the computer system further comprises:
a second component functioning as the network interface card, the access switch, and a central processing unit.

17. The method of claim 11, further comprising:
processing data, by the first component, including operations relating to a cyclic redundancy check, a hash function, and encryption;
handling, by the first component, network communication; and
handling, by the first component, communication between a pod switch and the plurality of storage devices.

18. The method of claim 11, further comprising:
performing, by a controller of a respective storage drive, one or more of: erasure coding; compression; sorting; and filtering.

19. A non-transitory computer-readable storage medium storing instructions that when executed by a computer cause the computer to perform a method, wherein the computer comprises a storage device associated with a computer system,
wherein the computer system comprises:
a plurality of storage devices;
a first component of a computing device, wherein the first component is configured to function both as a network interface card and as an access switch, by handling communications to and from a plurality of pod switches and by handling communications to and from the plurality of storage devices, which allows the computing device to communicate with the pod switches without a separate layer for the access switch, wherein the first component is coupled to a port on a respective storage device,
wherein the respective storage device comprises: the port coupled to the first component; at least one microprocessor; a plurality of storage drives with non-volatile memory; and a plurality of PCIe lanes via which to access the plurality of storage drives, and
wherein the port comprises an Ethernet port, wherein the at least one microprocessor and the PCIe lanes comprise a storage system on chip (SoC) component of the respective storage drive; and
the computing device which includes the first component,
wherein the method comprises:
receiving, by the computing device, a request to write data to a non-volatile memory of the computer system;
transmitting the data, by the computing device via the first component, to a selected storage device;
writing the data to a non-volatile memory of a first storage drive of the selected storage device;
managing, by the storage SoC component, the plurality of storage drives; and
performing, by the storage SoC component, operations relating to a file system and a flash translation layer module.

20. The storage medium of claim 19, wherein the method further comprises:
performing, by the computing device, general computation tasks associated with the computer system;
processing, by the first component, the data to obtain processed data; and
transmitting the processed data, by the computing device via the first component, to the selected storage device,
wherein writing the data to the non-volatile memory of the first storage drive of the selected storage device comprises:
determining, by a flash translation layer module of the selected storage device, the first storage drive of the selected storage device to which to write the processed data;
performing, by a controller of the first storage drive, specific in-drive computation tasks on the processed data to obtain further processed data; and
writing, by the controller of the first storage drive, the further processed data to the non-volatile memory of the first storage drive.

* * * * *